United States Patent
Merrill et al.

[19]

[11] Patent Number: 6,013,592
[45] Date of Patent: Jan. 11, 2000

[54] HIGH TEMPERATURE INSULATION FOR CERAMIC MATRIX COMPOSITES

[75] Inventors: Gary B. Merrill, Monroeville, Pa.; Jay Alan Morrison, Orlando, Fla.

[73] Assignee: Siemens Westinghouse Power Corporation, Orlando, Fla.

[21] Appl. No.: 09/049,328

[22] Filed: Mar. 27, 1998

[51] Int. Cl.$^7$ .................................................. C04B 38/08
[52] U.S. Cl. ........................... 501/80; 501/103; 501/105; 501/127; 501/128; 501/153; 501/154
[58] Field of Search ............................... 501/80, 127, 128, 501/103, 105, 153, 154; 428/402, 472

[56] References Cited

U.S. PATENT DOCUMENTS

| | | |
|---|---|---|
| 3,053,694 | 9/1962 | Daunt et al. . |
| 3,888,691 | 6/1975 | Villani et al. ............................. 501/80 |
| 3,975,165 | 8/1976 | Elbert et al. . |
| 4,177,308 | 12/1979 | Beeler et al. . |
| 4,247,249 | 1/1981 | Siemers . |
| 4,269,903 | 5/1981 | Clingman et al. . |
| 4,374,173 | 2/1983 | Adamovic . |
| 4,405,284 | 9/1983 | Albrecht et al. . |
| 4,423,097 | 12/1983 | Mons et al. . |
| 4,450,184 | 5/1984 | Longo et al. . |
| 4,521,496 | 6/1985 | Sara . |
| 4,639,388 | 1/1987 | Ainsworth et al. . |
| 4,704,332 | 11/1987 | Brennan et al. . |
| 4,867,639 | 9/1989 | Strangman . |
| 5,064,727 | 11/1991 | Naik et al. . |
| 5,252,526 | 10/1993 | Whittemore et al. ..................... 501/80 |
| 5,320,909 | 6/1994 | Scharman et al. . |
| 5,434,210 | 7/1995 | Rangaswamy et al. . |
| 5,472,315 | 12/1995 | Alexander et al. . |
| 5,688,728 | 11/1997 | Niwa et al. ............................... 501/80 |
| 5,705,266 | 1/1998 | Keelan et al. . |

FOREIGN PATENT DOCUMENTS 751 104  1/1997  European Pat. Off. .

Primary Examiner—Mark L. Bell
Assistant Examiner—David Sample
Attorney, Agent, or Firm—Eckert Seamans Cherin & Mellott, LLC

[57] ABSTRACT

A ceramic composition is provided to insulate ceramic matrix composites under high temperature, high heat flux environments. The composite comprises a plurality of hollow oxide-based spheres of varios dimentions, a phosphate binder, and at least one oxide filler powder, whereby the phosphate binder partially fills gaps between the spheres and the filler powders. The spheres are situated in the phosphate binder and the filler powders such that each sphere is in contact with at least one other sphere. The spheres may be any combination of Mullite spheres, Alumina spheres, or stabilized Zirconia spheres. The filler powder may be any combination of Alumina, Mullite, Ceria, or Hafnia. Preferably, the phosphate binder is Aluminum Ortho-Phosphate. A method of manufacturing the ceramic insulating composition and its application to CMC substates are also provided.

15 Claims, 2 Drawing Sheets

… …

HIGH TEMPERATURE INSULATION FOR CERAMIC MATRIX COMPOSITES

RELATED APPLICATION

The present invention is related by subject matter to the inventions disclosed in commonly assigned application having Ser. No. 09/049,369, filed on Mar. 27, 1998, entitled "Use of High Temperature Insulation For Ceramic Matrix Composites in Gas Turbines," (Attorney Docket Nos. T2-97-26 and T2-97-44), which is incorporated herein by reference in its entirety.

This invention was conceived under United States Department of Energy Contract DE-FC21-95MC32267. The United States Government has certain rights hereunder.

FIELD OF THE INVENTION

The present invention relates generally to high temperature ceramic insulating materials and applications to ceramic matrix composites.

BACKGROUND OF THE INVENTION

Various insulating materials to be used as coatings have been developed to strengthen the resistance of underlying substrates to increased temperatures. Thermal Barrier Coatings (TBCs) are commonly used to protect a machine's critical components from premature breakdown due to increased temperatures to which the components are exposed. Generally, TBCs extend the life of critical components by reducing the rate of metal waste (through spalling) by oxidation.

A fundamental drawback of TBCs is a limitation in thickness that can be used. This thickness limitation of approximately 0.5 mm is due to manufacturing-induced residual stresses, prohibitive costs, required life of the TBC material, temperature limit of the TBC, and mismatches in the coefficients of thermal expansion of the TBC and the substrate. In addition, microstructure of conventional TBCs (those applied by both air plasma spray and physical vapor deposition) is dictated by process conditions, is limited in versatility, and is prone to dimensional and thermal instability at temperatures greater than 1000° C.

Materials comparable to TBCs are fibrous ceramic insulating materials. A major drawback of these materials, however, is that they have low densities which lead to very poor erosion resistance. Therefore, fibrous ceramic insulating materials are inapplicable to high velocity gas flow applications.

Monolithic tiles are another material to be used for protecting critical components in high temperature conditions. These tiles have good erosion resistance and insulating properties, however, they are susceptible to thermal shock damage and catastrophic failure. It is, therefore, desirable to provide insulating materials that can withstand high temperatures without the use of thermal barrier coatings, fibrous ceramic insulating materials, or monolithic ceramic tiles.

Commercially available ceramic matrix composites (CMCs) have many potential applications in high temperature environments. CMCs, however, are limited in their exposure to temperatures near 1200° C. for long periods of time. In addition, CMCs cannot be effectively cooled under high temperatures (>1400° C.) or high heat flux conditions because of their lower conductivity than metals and their limitations in cooling arrangements due to manufacturing constraints. It is, therefore, desirable to provide a material that can be used to insulate moderate temperature ceramic matrix composites, is also erosion resistant, thermal shock, resistant, and has coefficients of thermal expansion relatively similar to that of CMCs.

European Patent Office publication No. 007,511,04, entitled "An Abradable Composition," filed Jan. 2, 1997, discloses a ceramic abradable material that can be used to seal ceramic turbine components. This material, however, purportedly has a high temperature capability of only 1300° C.

SUMMARY OF THE INVENTION

A ceramic insulating composition to be used over a higher strength, lower temperature ceramic for application in high temperature environments is provided. The composition comprises a plurality of hollow oxide-based spheres of various dimensions, a phosphate binder, and at least one oxide filler powder, whereby the phosphate binder partially fills gaps between the spheres and the filler powders. The spheres are situated in the phosphate binder and the filler powders such that each sphere is in contact with at least one other sphere.

The spheres may be any combination of Mullite spheres, Alumina spheres, or stabilized Zirconia spheres. Each of the Mullite spheres has a diameter in the range of approximately 0.1 to approximately 1.8 mm, and preferably approximately 0.8 to approximately 1.4 mm. Each of the Alumina spheres has a diameter in the range of approximately 0.1 to approximately 1.5 mm, and preferably approximately 0.3 to approximately 1 mm, and each of the stabilized Zirconia spheres has a diameter in the range of approximately 0.1 to approximately 1.5 mm, and preferably approximately 0.8 to approximately 1.2 mm.

When only Mullite spheres are used, the spheres have a weight percentage of 32%±10% of the composition. When only Alumina spheres are used, the spheres have a weight percentage of 63%±15% of the composition. When only stabilized Zirconia spheres are used, the spheres have a weight percentage of 58%±15% of the composition. In one preferred embodiment of the composition, the spheres are 20% Mullite spheres by volume and 80% Alumina spheres by volume The filler powder may be any combination of Alumina, Mullite, Ceria, or Hafnia. In one preferred embodiment of the composition containing mullite spheres and mullite powder, the mullite spheres have a weight percentage of 32%±10%, the mullite filler powder has a weight percentage of 32%±15%, and the phosphate binder has a weight percentage of 31%±15% of the slurry composition. In this preferred embodiment, when only Mullite is used as the filler powder, the combination of the phosphate binder and the Mullite has a viscosity of approximately 9,000 centipoise.

A method of manufacturing the ceramic insulating composition of the present invention is also provided. The method comprises the following steps: (a) mixing raw materials to form a viscous slurry, the raw materials comprising a phosphate binder and oxide filler powders; (b) adding a predetermined amount of hollow oxide-based spheres to the slurry to create a slurry mixture; (c) cast the mixture into presoaked molds; (d) allow the castings, which have a viscosity, to dry; (e) when the viscosity of the castings is sufficiently high for "green" bodies to be extracted from the molds with minimal dimensional distortion, remove the "green" bodies; (f) after the "green" bodies have been removed, recycle the molds by (i) washing out the leached phosphate by running in water followed by oven drying, and (ii) when fully dry, if the dry weight of the mold is within approximately 1% of the original dry weight, use the mold again to perform another casting; (g) transfer the "green" bodies to a drying oven to remove free water; (h) fire the casts, evaporating residual free water and thermally transform the phosphate to a refractory bond in the process; and (j) finish machine as required.

In a preferred procedure, step (c) of the method of manufacturing the ceramic insulating composition of the present invention further comprises casting the mixture within approximately 24 hours of being made, step (g) further comprises transferring the "green" bodies to a drying oven at approximately 80° C. to remove free water, step (h) further comprises transferring the casts to the firing oven when the "green" bodies become stable, and step (i) further comprises the following steps: (i1) begin firing by slowly heating the firing oven to a temperature of approximately 120° C.; (i2) dwell increasing the firing oven at a temperature of approximately 120° C. until most of the free water is removed by evaporation; (i3) slowly increase the temperature of the firing oven to a temperature of approximately 250° C.; (i4) dwell increasing the temperature at a temperature of approximately 250° C. until all of the free water is removed by evaporation; and (i5) slowly increase the temperature of the firing oven to a temperature of approximately 1200° C. to form a refractory phase of the phosphate.

In another preferred procedure, step (e) further comprises a step after extraction from the molds, of shaping the "green" bodies to conform to the contour of a mating substrate surface. If performed, this step will achieve near net shaping capability.

DETAILED DESCRIPTION OF THE PREFERRED EMBODIMENTS

Figure 1:
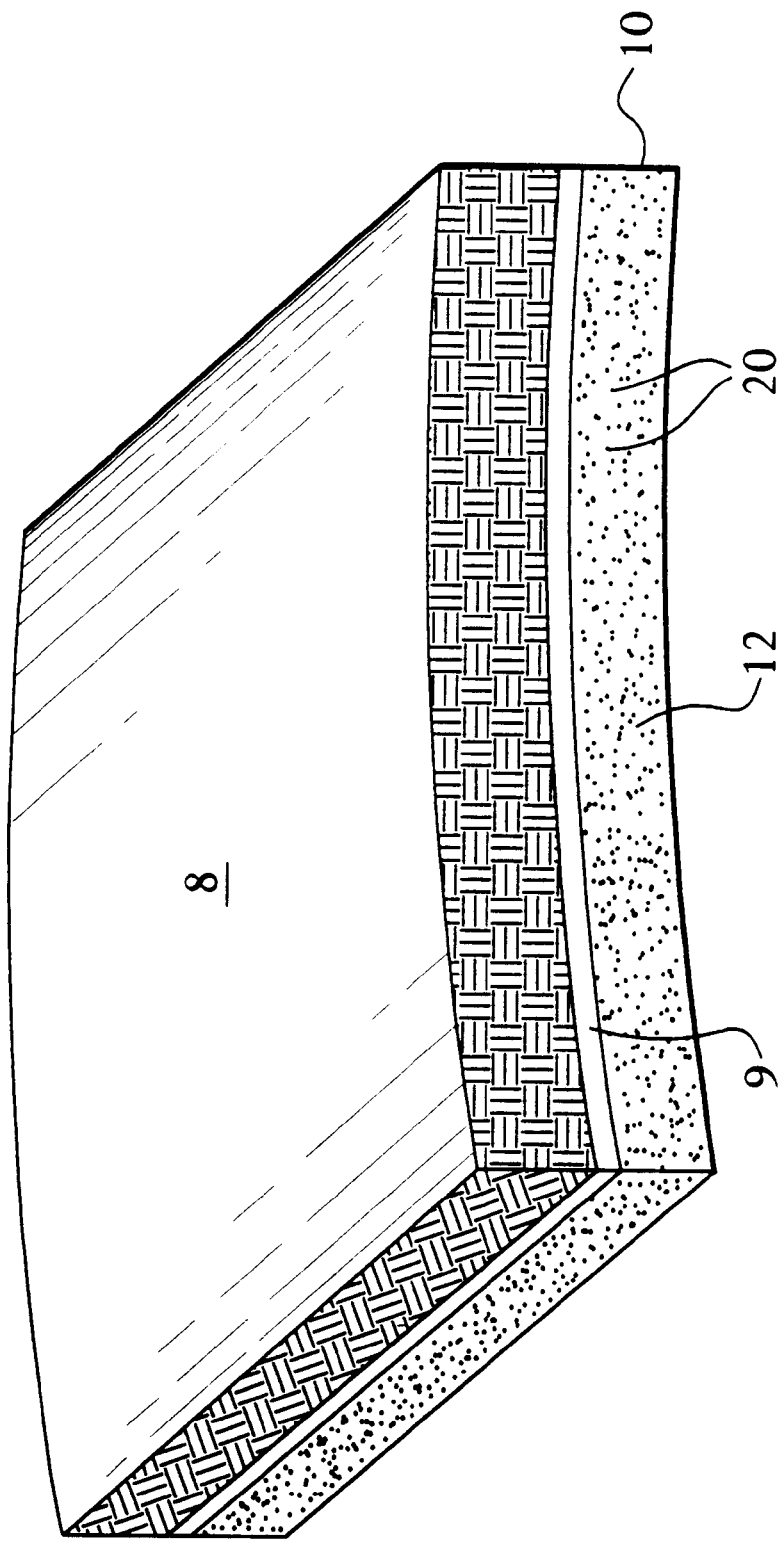
FIG. 1 is an enlarged perspective view of a preferred embodiment of ceramic insulating coating according to the present invention.

The present invention provides a material that uses high temperature ceramic material as an insulator over a higher strength, lower temperature ceramic for application to high temperature environments. Referring to the drawings, there is shown in FIG. 1 an enlarged perspective view of a preferred embodiment of ceramic insulating composition 10 (or coating 10) according to the present invention. This view also shows a cross section of ceramic insulating coating 10 placed on a substrate 8 of ceramic matrix composite and kept in place with a layer of adhesive 9.

Figure 2:
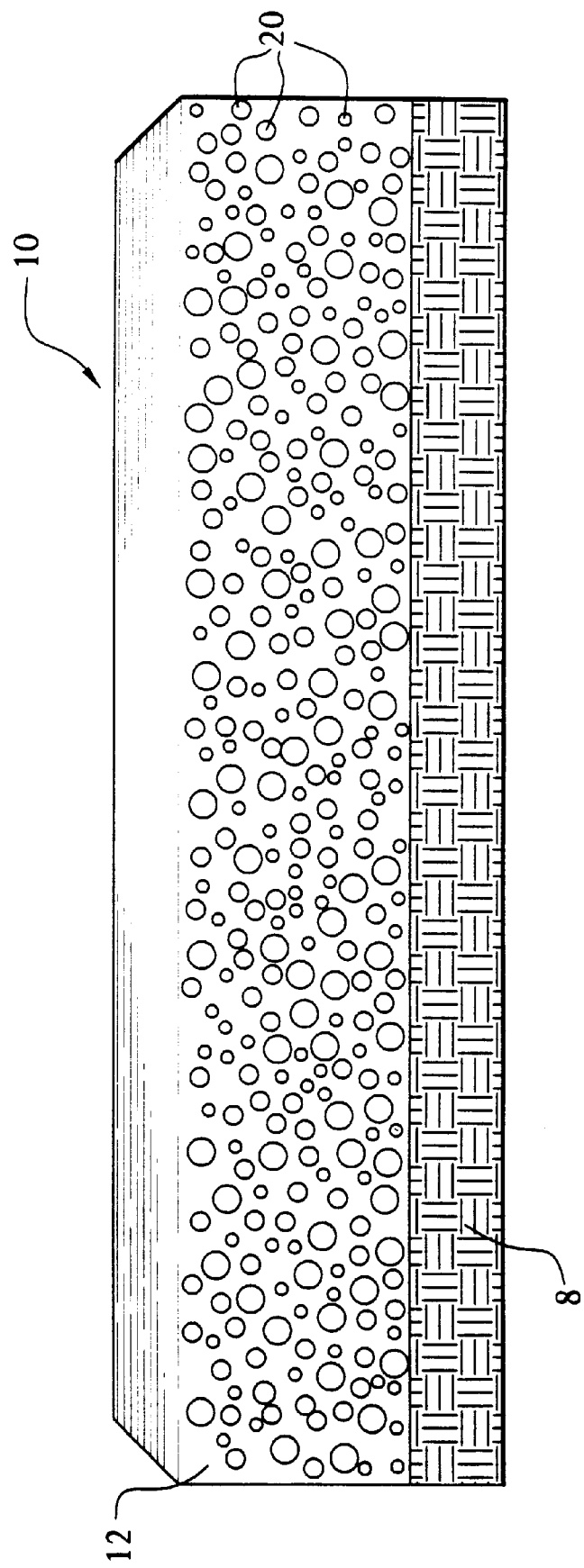
FIG. 2 is a further enlarged perspective view, depicting a cross section, of a preferred embodiment of ceramic insulating coating according to the present invention.

FIG. 2 shows a further enlarged perspective view, depicting the cross section, of a preferred embodiment of ceramic insulating coating 10 according to the present invention. The coating 10 comprises hollow oxide-based spheres 20 of various dimensions in a combination 12 of a phosphate binder and various oxide filler powders. The phosphate binder "bridges" the gaps between the spheres 20 and the oxide filler powders. The spheres 20 are manufactured at high enough temperatures to make them stable at 1600° C., depending on the particular composition of the coating 10. Firing temperatures up to 1600° C. are used to create the coating, which is dimensionally stable, chemically stable and erosion resistant.

Dimensional stability is primarily controlled by the spheres 20. The coating 10 achieves improved erosion resistance by introducing closed porosity on a macroscopic scale with a relatively dense arrangement of spheres 20. Preferably, the spheres 20 are arranged so that each sphere is in contact with at least one other sphere 20. More preferably, the spheres 20 are arranged so that each sphere is in contact with several other spheres 20, i.e., at least 3 or 4 spheres 20. This provides the improved dimensional stability, especially at elevated temperatures near 1600° C. Sphere contact such as that present in the coating 10 and the resulting dimensional stability is not achieved by prior art coatings. A composition 10 according of the present invention is stable preferably at temperatures greater than approximately 1300° C., and more preferably at temperatures up to approximately 1600° C.

Oxide filler powders in combination with the phosphate binder can be varied to control properties of the coating 10. Specific coating systems may be formulated to cover a range of coefficients of thermal expansion (CTE). As understood by those of skill in the art, the CTE of the coating 10 must be as close as practically possible to the CTE of the substrate 8 for the coating 10 to remain in place on the substrate 8. Various properties of exemplary coatings 10, A and B, are shown in Table 1.

TABLE 1

| Material | A | B |
| --- | --- | --- |
| Use Temp (° C.) | 1200 | 1600 |
| CTE (×10⁻⁶ mm/mm ° C.) | 5.85 | 5.85 |
| Thermal Conductivity (W/mK) at 1400° C. | 1.27 | 2.21 |
| Erosion Resistance* (g/kg) at 1100° C. | 7.5 | 4.5 |

*Tested at 15° impingement angle, 900 ft/s erodent speed.

Material properties such as thermal conductivity and erosion resistance can be tailored by specific selection of filler materials or sphere compositions. The hollow oxide-based spheres 20 of the coating material of the present invention can be made of either Mullite, Alumina, stabilized Zirconia (usually Yttria stabilized Zirconia) or any combination thereof. The preferred range of diameters of the Mullite spheres is approximately 0.4 to approximately 1.8 mm, and more preferably approximately 0.8 to approximately 1.4 mm. The preferred range of diameters of the Alumina spheres is approximately 0.3 to approximately 1 mm. The preferred range of diameters of the stabilized Zirconia spheres is approximately 0.6 to approximately 1.2 mm, and more preferably approximately 0.8 to approximately 1 mm.

When only Mullite spheres are used, i.e., KCM Holospheres® manufactured by Keith Ceramics, Inc. of Great Britain, the preferable weight percentage of spheres 20 in the coating 10 is 32%±10%, more preferably 32%±5%, and even more preferably approximately 32%. When only Alumina spheres are used, i.e., manufactured by Ceramic Fillers, Inc. of Atlanta, Ga., the preferable weight percentage of spheres 20 in the coating 10 is 63%±15%, more preferably 63%±10%, even more preferably 63%±5%, and most preferably approximately 63%. When only stabilized Zirconia spheres are used, i.e., manufactured by Keith Ceramics, Inc., the preferable weight percentage of spheres 20 in the coating 10 is 58%±15%, more preferably 58%±10%, even more preferably 58%±5%, and most preferably approximately 58%.

To tailor a particular coating to obtain a particular CTE to "match" the CTE of the intended substrate 8, one merely varies the combination of spheres 20. For example, monolithic stabilized Zirconia spheres have the highest CTE (approximately $10 \times 10^{-6}$ mm/mm° C.), monolithic Mullite spheres have the lowest (approximately $5.7 \times 10^{-6}$ mm/mm° C.), and monolithic Alumina spheres have an intermediate value (approximately $8.0 \times 10^{-6}$ mm/mm° C.).

A preferred combination of spheres 20 is 20% Mullite and 80% Alumina by volume. As displayed in Table 2, this sphere composition yields a % linear change of 0.5972, which "matches" a value of 0.5934 for Composite A (an oxide-based CMC material) and a value of 0.6031 for composite B. For Composite C (a high silica containing oxide-based composite material), an all mullite sphere composition is preferred.

TABLE 2

| Sphere Composition | Volumetric Ratio | % Linear Change at 1000° C. | Oxide/Oxide Substrate Composition (% Linear Change at 1000° C.) |
|---|---|---|---|
| Mullite | 100 | 0.5657 | 0.5631 (C) |
| Mullite and Stabilized Zirconia | 50/50 | 0.5660 | |
| Mullite and Alumina | 50/50 | 0.5763 | |
| Mullite and Alumina | 20/80 | 0.5972 | 0.5934 (A) and 0.6031 (B) |
| Mullite and Alumina | 10/90 | 0.6210 | |
| Mullite and Alumina | 5/95 | 0.6337 | |
| Alumina | 100 | 0.6380 | |
| Stabilized Zirconia | 100 | 0.7325 | |

The oxide filler powders can be Alumina, Mullite, Ceria, Hafnia or any combination thereof. Preferably, Alumina or Mullite is used as the filler powder, and most preferably, Mullite is used because of its superior high temperature properties. Preferably, when Mullite is used, the weight percentage of the oxide filler powder in the coating 10 is 32%×10%×15%, more preferably 32%×10%, even more preferably 32%×5%, and most preferably approximately 32%. The preferred weight percentages of the oxide filler powders vary because of the different atomic mass and particle size of each.

Preferably, the phosphate binder is Aluminum Ortho-Phosphate in a weight percentage of 31%±15%, more preferably 31%±10%, even more preferably 31%±5%, and most preferably approximately 31%. Preferably, a combination of Aluminum Ortho-Phosphate binder and Mullite filler powder has a viscosity of approximately 9,000 centipoise, measured with a Brookfield® RV viscometer having a spindle No. of 7 and a rpm of 20.

The manufacturing process for the coating 10 of the present invention comprises the following steps: (1) mixing a slurry, (2) casting the slurry, (3) controlled drying, (4) removal of the "green" body, (5) firing, and (6) machining. The mixture is formulated such that the end product possesses a CTE practically identical to that of the CMC substrate 8.

The process starts with the mixing of raw materials to form a viscous slurry and is accomplished in two stages. First, Aluminum Ortho-Phosphate and the filler powder is mixed to an exact formulation of 50% aqueous solution of Aluminum Ortho-Phosphate and is stored air-tight (with a shelf life of up to 2 months). Alter-natively, one can start with a 50% aqueous solution of Aluminum Ortho-Phosphate.

When a casting is performed, exact amounts of hollow spheres 20 are added to the slurry and the slurry mixture is then cast within approximately 24 hours of being made. The slurry containing the hollow spheres 20 is cast into presoaked molds. The molds are presoaked with deionized water prior to casting to allow the capillary drying of the casting to be effective. If the slurry was cast into a dry mold, water from the cast would be extracted too quickly into the mold creating a dry surface on the casting preventing further controlled drying from occurring. This would result in an non-homogenous end product. At a critical stage in the drying of the castings, the viscosity is sufficiently high for the "green" bodies to be extracted from the molds with minimal dimensional distortion ("green" body is the term used for the composition prior to firing).

After removal from the mold, the "green" bodies are carefully transferred to a drying oven (at approximately 80° C.). In a preferred procedure, before drying, the "green" bodies are shaped to conform to the contour of a mating substrate surface. This step will achieve near net shaping capability. After drying, the "green" bodies are then transferred to the firing oven. During firing, a slow heating rate is used with a dwell at approximately 250° C. which ensures that all of the free water is removed by this stage.

Between approximately 250° C. and approximately 565° C., steady dehydration of the phosphate commences and this is controlled by a slow heating rate through this temperature range. The rest of the firing cycle is dedicated to chemical changes in the phosphate structure. Incorrect procedure for removing water from this material system will result in a defective and weak microstructure.

The molds are recycled after the "green" bodies have been removed. This is achieved by washing out the leached phosphate with running water followed by oven drying. When fully dry, the dry weight of the mold must be within approximately 1% of the original dry weight in order for the mold to be used again. It can be expected to reuse a mold up to 12 times.

In preparation for firing, the "green" bodies can be stacked which minimizes furnace space. The resulting simplified firing cycle is shown in Table 3.

TABLE 3

| Step Number | Start Temp (° C.) | Ramp Rate (° C./min) | Hold Temp (° C.) | Dwell Time (mins) |
|---|---|---|---|---|
| 1 | 80 | 1 | 250 | 60 |
| 2 | 250 | 3 | 1600 | 240 |
| 3 | 1600 | 10 | ambient | END |

The final phase of the manufacturing process is to machine the insulating coating 10.

This manufacturing process allows molds to be reused by virtue of the removal of green bodies at a low temperature stage. This features yields the following benefits: the reduction of both raw materials and machining, reduced waste, more flexibility in the manufacturing process, "green" preforms can be bonded together to make more complex shapes and/or the attachment of different compositions, the reduction of capital equipment, a reduction in furnace space for firing by prior removal of mold material results in smaller furnaces with less costly initial outlays and running costs, reduction of manufacturing cycle time, removal of "green"

bodies from the molds allows recasting to be concurrent with firing and removes the need for labor intensive breakout of fired casts from spent molds, and simplified firing cycle makes processing easier to duplicate.

At temperatures up to approximately 750° C. the phosphate binder may exist in a glassy form, which is compliant during the firing process. This may provide the potential for shape forming during the first firing. By firing the material up to temperatures of approximately 1200° C., a phosphate "bridge" is produced that gives a compliant matrix that can be used as a displacement type abradable seal.

By heat treating further to approximately 1600° C., the phosphate "bridge" network that connects the constituents of the material system (the particles and spheres) is significantly modified to form more localized and densified phosphate agglomerations within the microstructure. A material system with new properties results from this change that retains up to 80% of its room temperature strength at 1400° C., has similar thermal conductivity and excellent erosion resistance (approximately a factor of 2 times better than currently available TBC systems used on metallic substrates).

The material is fired stand alone and then ground to shape prior to bonding to the substrate 8. The adhesive 9 will vary according to the substrate 8. Direct coating onto the substrate 8, however, is also possible utilizing the substrate 8 and/or in-situ curing in the application environment.

Potential applications for the ceramic insulating coating 10 of the present invention are vast. Such applications would include, but not limited to, high heat flux environments such as those occurring in gas turbine hot section components or re-entry vehicle surfaces. These coatings can be applied to a wide variety of substrate materials including, but not limited to, oxide matrix composites (e.g., Mullite, Aluminosilicate and Alumina), Silicon Carbide matrix composites (made by techniques such as Chemical Vapor Infiltration or melt-infiltration), Silicon Nitride matrix composites (made by means such as reaction bonding, nitriding, hot pressing or pressureless sintering).

Application of the coating 10 may be performed by forming the coating 10 separately and subsequently bonding the coating 10 to the substrate 8 using Aluminum Phosphate-based adhesives (or other ceramic-based adhesive systems) cured at intermediate temperatures, i.e., around 800° C.–1000° C. Coatings of mullite or alumina may be applied to the substrate 8 prior to bonding to prevent fiber damage during curing and/or to facilitate bonding. These coatings are especially desirable when bonding to non-oxide substrates 8.

It is to be understood that even though numerous characteristics and advantages of the present invention have been set forth in the foregoing description, together with details of the structure and function of the invention, the disclosure is illustrative only. Accordingly, changes may be made in detail, especially in matters of shape, size and arrangement of parts within the principles of the invention to the full extent indicated by the broad general meaning of the terms in which the appended claims are expressed.

We claim:

1. A ceramic insulating composition comprising:
    a plurality of hollow oxide-based spheres of various dimensions;
    a phosphate binder; and
    at least one oxide filler powder, whereby said phosphate binder partially fills gaps between said spheres and said filler powders;
    whereby said spheres are situated in said phosphate binder and said filler powders such that each sphere is in contact with at least one other sphere.

2. The composition of claim 1 stable at temperatures up to approximately 1600° C.

3. The composition of claim 1 having a coefficient of thermal expansion in the range of approximately $5.7 \times 10^{-6}$ mm/mm° C. to approximately $10 \times 10^{-6}$ mm/mm° C.

4. The composition of claim 1 having thermal conductivity less than approximately 2.5 W/km.

5. The composition of claim 1 having an erosion resistance in the range of approximately 4.5 g/kg to approximately 7.5 g/kg, when measured at 1100° C., a 15°impingement angle, and an erodent speed of 900 ft/s.

6. The composition of claim 1, wherein spheres are selected by one or more of the following:
    Mullite spheres; Alumina spheres; and stabilized Zirconia spheres.

7. The composition of claim 6, wherein:
    each of said Mullite spheres has a diameter in the range of approximately 0.4 to approximately 1.8 mm;
    each of said Alumina spheres has a diameter in the range of approximately 0.3 to approximately 1 mm; and
    each of said stabilized Zirconia spheres has a diameter in the range of approximately 0.6 to approximately 1.2 mm.

8. The composition of claim 1, wherein said spheres are one of the following:
    Mullite spheres, wherein said spheres have a weight percentage of 32%±10% of the composition;
    Alumina spheres, wherein said spheres have a weight percentage of 63%±15% of the composition; and
    Stabilized Zirconia spheres, wherein said spheres have a weight percentage of 58%±15% of the composition.

9. The composition of claim 1, wherein said spheres are 20% Mullite of said spheres by volume and 80% Alumina of said spheres by volume.

10. The composition of claim 1, wherein said filler powder is one or more of the following:
    Alumina; Mullite; Ceria; and Hafnia.

11. The composition of claim 1, wherein said filler powder is Mullite filler powder.

12. The composition of claim 11, wherein said oxide filler powder has a weight percentage of 32%±15% of the composition.

13. The composition of claim 1, wherein said phosphate binder is Aluminum Ortho-Phosphate.

14. The composition of claim 13, wherein said Aluminum Ortho-Phosphate has a weight percentage of 31%±15% of the composition.

15. The composition of claim 13, wherein said filler powder is Mullite and said combination of said phosphate binder and said Mullite has a viscosity of approximately 9,000 centipoise.

* * * * *